United States Patent
Leigh et al.

(10) Patent No.: US 6,957,511 B1
(45) Date of Patent: Oct. 25, 2005

(54) SINGLE-STEP ELECTROMECHANICAL MECHANICAL POLISHING ON NI-P PLATED DISCS

(75) Inventors: Joseph Leigh, Campbell, CA (US); Connie Liu, San Jose, CA (US); David Kuo, Palo Alto, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 268 days.

(21) Appl. No.: 09/712,478

(22) Filed: Nov. 13, 2000

Related U.S. Application Data

(60) Provisional application No. 60/165,302, filed on Nov. 12, 1999.

(51) Int. Cl.⁷ .................................................. B24B 1/00
(52) U.S. Cl. ............................. 451/36; 451/37; 451/41; 451/57
(58) Field of Search ............................. 451/36, 37, 41, 451/57, 59, 60

(56) References Cited

U.S. PATENT DOCUMENTS

| | | | | |
|---|---|---|---|---|
| 5,586,926 A | * | 12/1996 | Wedell et al. | 451/299 |
| 5,637,028 A | * | 6/1997 | Haisma et al. | 451/28 |
| 5,899,794 A | * | 5/1999 | Shige et al. | 451/304 |
| 5,911,619 A | | 6/1999 | Uzoh et al. | |
| 6,171,467 B1 | | 1/2001 | Weihs et al. | |
| 6,350,178 B2 | * | 2/2002 | Weiss et al. | 451/41 |
| 6,375,545 B1 | * | 4/2002 | Yano et al. | 451/36 |

* cited by examiner

Primary Examiner—Joseph J. Hail, III
Assistant Examiner—Alvin J. Grant
(74) Attorney, Agent, or Firm—Raghunath S. Minisandram; Jesus Del Castillo

(57) ABSTRACT

Beginning with a smooth ground aluminum blank with a relatively thin layer of leveled Ni—P, circumferential electropolishing/texturing is carried out to achieve a smooth oriented surface. A conductive slurry is provided between the disc and a porous texturing tape which is in contact with a conducting plate or equivalent conductor. The disc serves as the anode, and the conducting plate as the cathode, while the slurry, being conductive, functions as an electrolyte. In the presence of current, a reverse electroplating occurs so that the Ni—P dissolves to form $Ni^{2+}$, or nickel ions which are carried away by the conductive slurry. The conductive slurry further supports or carries therein abrasive material so that by moving the porous texturing tape past the disc surface, the texturing tape picks up the abrasive material in the slurry and simultaneously with the reverse electroplating, provides the desired mechanical abrasion to achieve texturing of the disc surface. The abrasive material comprises diamond particles. The circumferential electropolishing/texturing polish is achieved by spinning the disc while applying the mechanical-chemical action through the slurry system to the disc surface with electric current passing through the electrically conducting interface during processing.

17 Claims, 8 Drawing Sheets

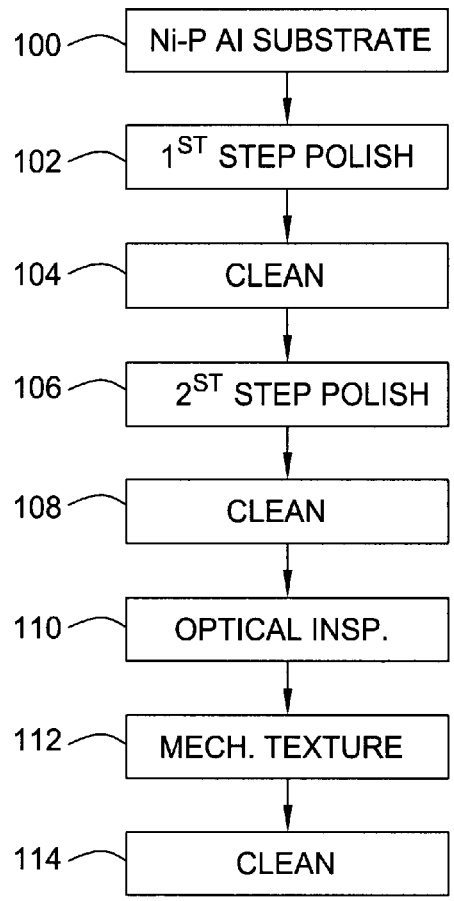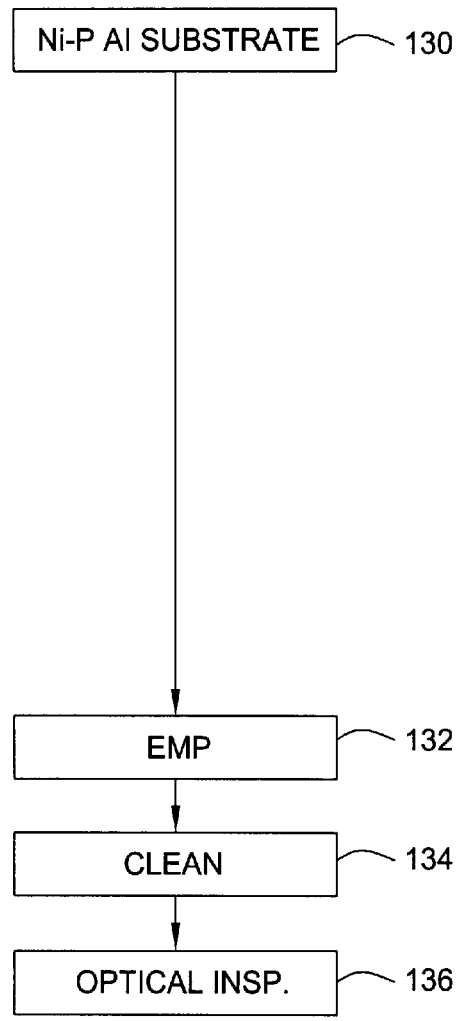
FIG. 1A
FIG. 1B

Ni-P PLATED Al DISC, CONVENTIONAL COLLOIDAL POLISHING

Ni-P PLATED Al DISC, EMP POLISHING

Ni-P PLATED Al DISC ( Al BLANK, Ra=80Å )
NO POLISHING

Ni-P PLATED Al DISC ( Al BLANK, Ra > 100Å )
EMP POLISHING 50 SEC.

Ni-P PLATED Al DISC ( Al BLANK, Ra=40Å )
EMP POLISHING 50 SEC.

SINGLE-STEP ELECTROMECHANICAL MECHANICAL POLISHING ON NI-P PLATED DISCS

CROSS-REFERENCE TO A RELATED APPLICATION

This invention is based on U.S. Provisional Patent Application Ser. No. 60/165,302 filed Nov. 12, 1999, entitled SINGLE-STEP ELECTROCHEMICAL MECHANICAL POLISHING ON Ni—P PLATED DISCS filed in the name of Joseph Leigh, Connie Liu and David Kuo. The priority of this provisional application is hereby claimed.

FIELD OF THE INVENTION

This invention relates generally to the field disc drive data storage devices, and more specifically the invention relates to an improved method for making the discs to be included in a disc drive storage device.

BACKGROUND OF THE INVENTION

Disc drive data storage devices are well known in the industry. Such devices use rigid discs coated with a magnetizable medium for storage of digital information on a plurality of circular concentric data tracks. The information is written to and read from the discs using a transducer head mounted on an actuator mechanism which moves the head from track to track across the surface of the disc under control of electronic circuitry. The disc or discs are mounted for rotation on a spindle motor which causes the disc to spin at a very high constant speed and the surfaces of the disc to pass under the heads.

As magnetic storage densities have increased, magnetic disc drives have been required to operate with increasingly greater precision. This requirement has meant that magnetic recording heads have been placed increasingly close to the surface of the magnetic disc. The interaction between the magnetic head and the recording surface has become increasingly precise. This requires that every surface of the disc be planarized to a high degree, so that the transducer head, which is flying over the surface of the disc, at a spacing of 25 nm can maintain that fly height without crashing into any bumps on the surface of the disc. It is known that the surface of the disc must be textured in order to optimize the magnetic recording performance of the disc. However, such texturing must be highly uniform so that no contact occurs between the transducer and the textured disc surface.

In order to achieve this goal, planetary polishing has been adopted as an effective method to planarize discs. The fundamental problem is that at least two polishing steps are required to reduce a standard Ni—P plated substrate to a super-smooth finish. The first step planarizes the disc to remove plating and grinding defects and the second reduces the high frequency roughness of the disc. These two polishing steps rely on chemical etching and mechanical abrasive action to remove Ni—P from the disc's surface and can be relatively time consuming.

As a result, the cost of consumables for polishing makes up a significant portion of the substrate cost. Additionally two washing steps are required; one between the two polishing steps and the final wash and these also contribute to yield loss and disc cost.

Moreover, the rotational quill action of the polishing pads generates random scratch patterns, which can produce random scratches particularly if a large abrasive particle (particle agglomerate) or foreign material is introduced into the system.

After the polishing steps, a further step called mechanical texturing is required to circumferentially orient the disc's surface to support an-isotropic or oriented recording. Therefore three mechanical "polishing" steps are required to produce a circumferentially textured disc.

Therefore a continuing need exists for a more cost effective approach to planarization of discs.

SUMMARY OF THE INVENTION

The purpose of this invention is to propose a method which reduces the number of process steps, shortens the processing time and decreases the consumable set. This can lead to substantial savings in process and equipment cost.

In a preferred approach, beginning with a smooth ground aluminum blank with a relatively thin layer of leveled Ni—P, circumferential electropolishing/texturing is carried out to achieve a smooth oriented surface. This electrochemical assisted polishing/texturing process enhances the stock removal rate, and shortens the overall process time.

Basically, a conductive slurry is provided between the disc and a porous texturing tape which is in contact with a conducting plate or equivalent conductor. The disc serves as the anode, and the conducting plate as the cathode, while the slurry, being conductive, functions as an electrolyte. In the presence of current, a reverse electroplating occurs so that the Ni—P dissolves to form $Ni^{2+}$, or nickel ions which are carried away by the conductive slurry. The conductive slurry further supports or carries therein abrasive material so that by moving the porous texturing tape past the disc surface, the texturing tape picks up the abrasive material in the slurry and simultaneously with the reverse electroplating, provides the desired mechanical abrasion to achieve texturing of the disc surface.

In a preferred form of the invention, the abrasive material comprises diamond particles. The circumferential electropolishing/texturing polish is preferably achieved by spinning the disc while applying the mechanical-chemical action through the slurry system to the disc surface with electric current passing through the electrically conducting interface during processing.

Other features and advantages of the invention will become apparent to a person of skill in this field who studies the following description of an embodiment given below in association with the following drawings.

BRIEF DESCRIPTION OF THE DRAWINGS

FIG. 1A is a flow diagram of the polishing process sequence for conventional planetary polishing of discs.

FIG. 1B is a flow diagram of the polishing process sequence for polishing discs according to the present invention.

DETAILED DESCRIPTION OF A PREFERRED EMBODIMENT

Figure 7:
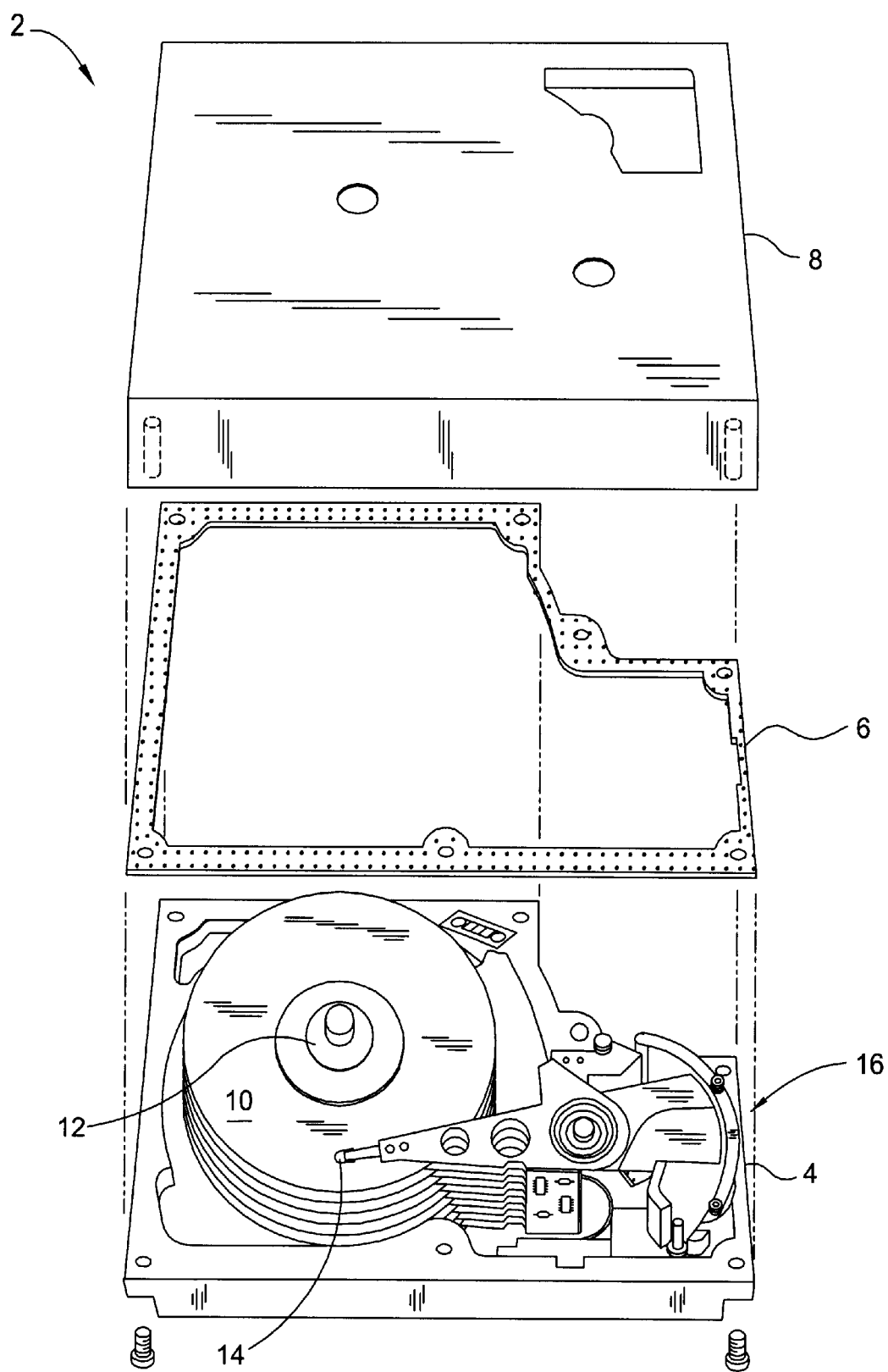
FIG. 7 is a plan view of a disc drive in which the discs made according to the present invention are useful.

FIG. 7 shows a plan view of a disc drive in which the present invention is useful. The disc drive 2 includes a base member 4 to which the internal components of the disc drive unit are mounted. The base member 4 couples to a seal 6 and a top cover 8 which forms a sealed environment or cavity within the housing so established for the critical parts of the disc drive 2. The disc drive 2 includes one or more discs 10 which are mounted for rotation on the spindle motor generally indicated at 12. A magnetic read-write head 14, one for each disc surface, is mounted to an actuator 16. In the example shown here, the actuator 16 is a rotary actuator which moves the heads to a desired position on the surface of the disc.

As is well known in this technology, it is essential to have smooth discs which typically comprise an aluminum substrate and a Ni—P layer which is circumferentially textured to enhance the magnetic recording properties of the recording layer.

FIGS. 1A and 1B comparatively illustrate the conventional processing sequence for polishing a disc shown in FIG. 1A, as compared to the polishing process sequence of the present invention shown in FIG. 1B. In FIG. 1A, beginning at step 100, with a standard Ni—P plated aluminum substrate, both a first step polish 102 and second step polish 106 are performed, with each polishing step followed by a cleaning step 104, 108, respectively. Thereafter, and after optical inspection 110, a mechanical texturing 112 is carried out followed by a further cleaning 114 step.

Figure 1C:
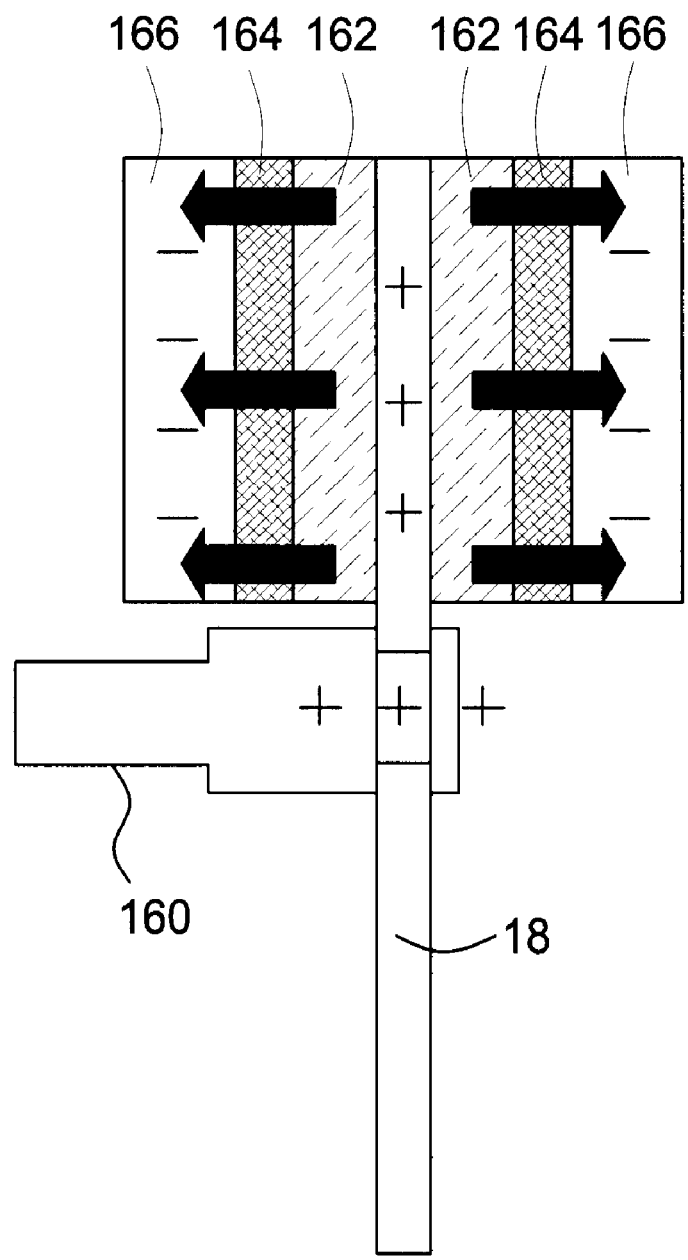
FIG. 1C schematically depicts an exemplary device used for polishing discs in accordance with the present invention.

In contrast, FIG. 1B illustrates the process sequence of the present invention having fewer steps. Beginning at step 130, the Ni—P plated aluminum substrate is preferably an aluminum blank substrate having a Ra less than 40 Angstroms which is Ni—P plated, although a standard Ni—P plated substrate could be used. Beginning with this Ni—P Plated aluminum substrate at step 130, the process proceeds directly to the electrochemical mechanical polishing (EMP) 132, followed by a cleaning step 134 and optical inspection 136. EMP is carried out using the system and method shown schematically in FIG. 1C which includes a disc 18 supported on a spindle 160 and submerged in a conductive slurry 162 (either wholly or partly). A porous texturing tape 164 is provided which will be in contact with the surface of the disc, on one side of the tape 164, and in contact with a conducting plate 166 with on the other side of the tape 164. Electrodes provide electrical current to the disc spindle 160 and conductive plate 166 so that the disc essentially serves as an anode and the conducting plate as a cathode for carrying out reverse electroplating. In the presence of the electrical current, the disc is rotated past the tape, although the tape may also be in motion. Three mechanisms work to both reduce the thickness of the Ni—P layer, as well as to provide the necessary and required abrasion to give the surface texturing on the disc. According to the first of these mechanisms, reverse electroplating occurs in the presence of the electrical current where the Ni—P dissolves to form $Ni^{2+}$ or nickel ions which can be carried away by the conductive slurry; the slurry comprises an electrolyte, as well as preferably some additives, in the plating solution which will react with the Ni—P to give a smooth finish. The second mechanism is chemical etch passivation or metal oxide/hydroxide corrosion which occurs with oxidation of the Ni—P layer which makes the reverse electroplating easier to carry out. This is a known form of slurry chemistry, and according to the preferred form of this invention utilizes ASNI(beta) or enthone 9950 versus standard fidelity 4355 or enthone 6450 Ni—P plating solutions. This improvement reduces the Ra further (below 20 Angstroms) and decreases the plating nodule dimensions.

Finally, the third mechanism is wherein relative motion occurs between the tape and disc. Preferably this comprises rotation of the disc past the porous texturing tape. An abrasive such as diamond particles is included in the slurry; since the texturing tape is porous, with the movement of the slurry through the tape, the abrasive is effectively absorbed into or held in the tape to provide the necessary mechanical abrasion. A final surface finish is achieved which has the direct effect of basic mechanical circumferential texturing of the plated disc.

The process simplification step, according to testing conducted with exemplary embodiments, occurs because of this electropolishing step using the conductive slurry and the porous tape, producing 5–10 times the Ni—P removal rate compared with standard mechanical texturing while still generating an extremely smooth final surface finish which does have the desired circumferential texture. This allows the substrate to start out rougher than previous control processes, and still achieves the same final surface finish and mechanical texturing. Key attributes of electropolishing include the slurry electrochemical potential, the texturing tape's hydrophillic properties or wettability which is necessary to allow the slurry to flow through the tape to close the circuit so that the Ni—P can be carried away from the surface of the disc, and the contact surfaces for the conducting electrodes which are necessary to provide the desired closed circuit between the disc which serves as the anode and the conducting plate or cathode which is on the distal side of the tape from the rotating disc.

Figure 2:
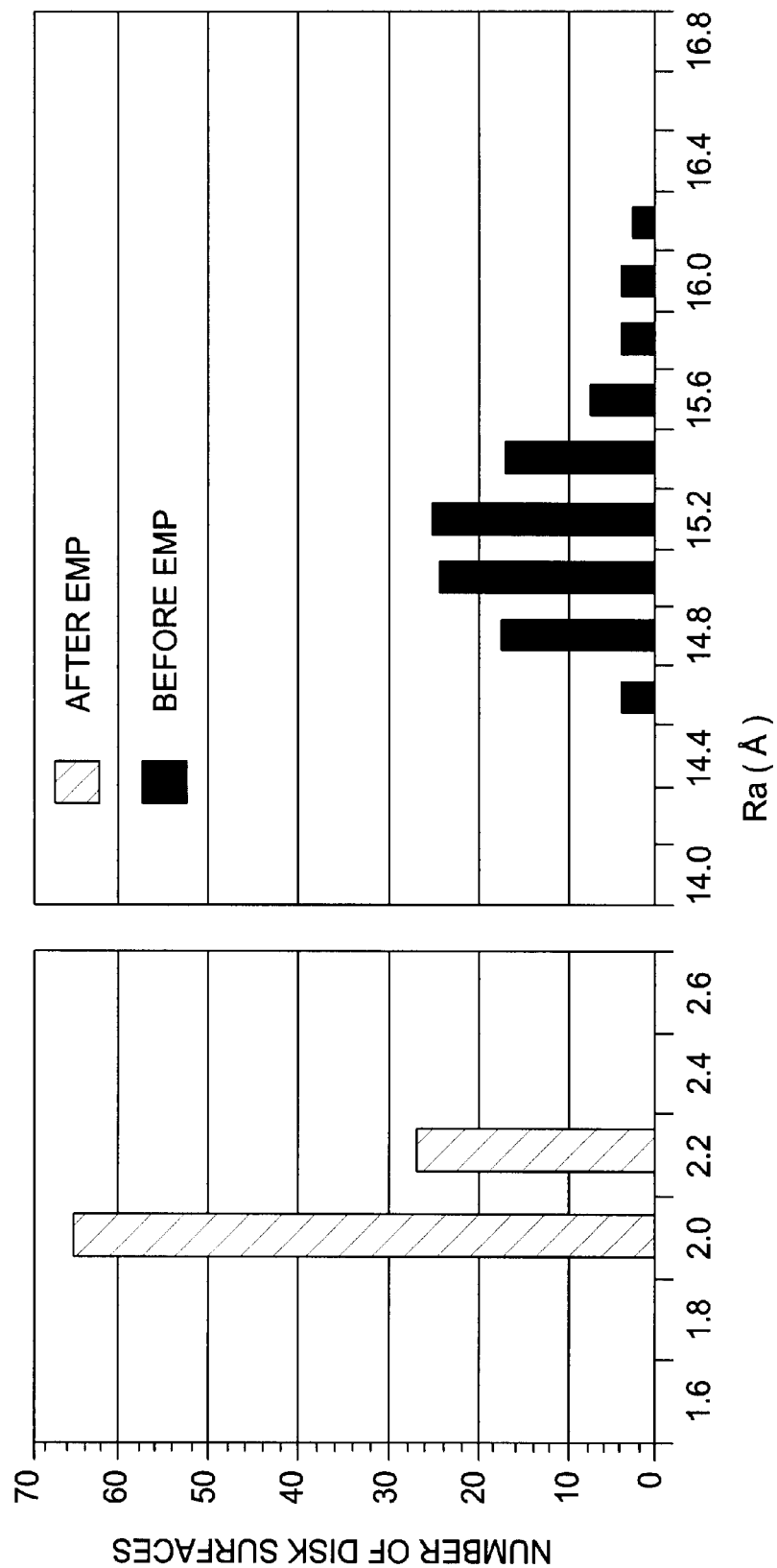
FIG. 2 is a plot showing the surface roughness (Ra) of discs before and after polishing discs in accordance with the present invention.
Figure 3A:
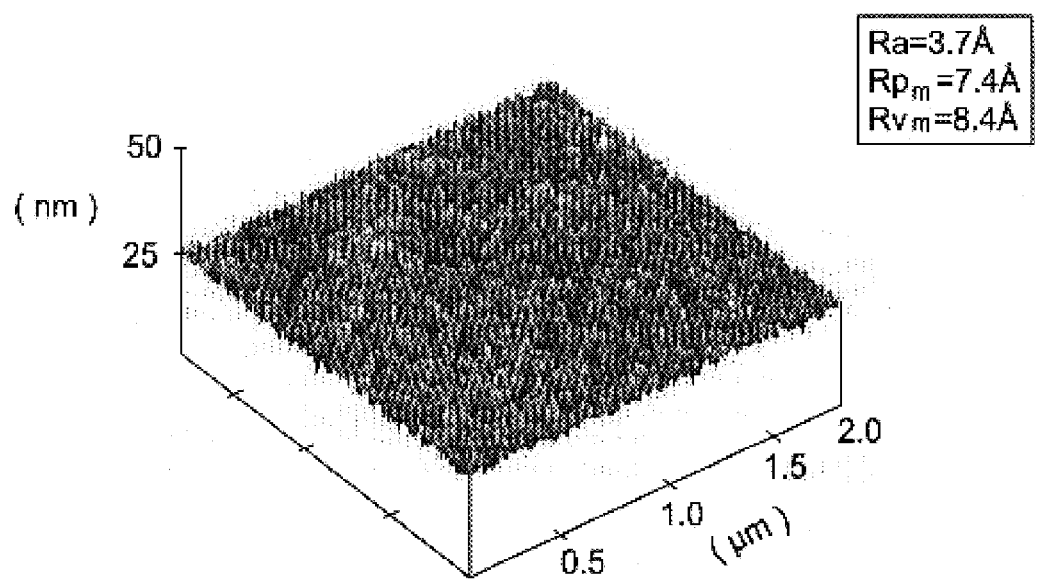
FIG. 3A is an AFM image of the surface of a Ni—P plated Al disc after conventional colloidal polishing.
Figure 3B:
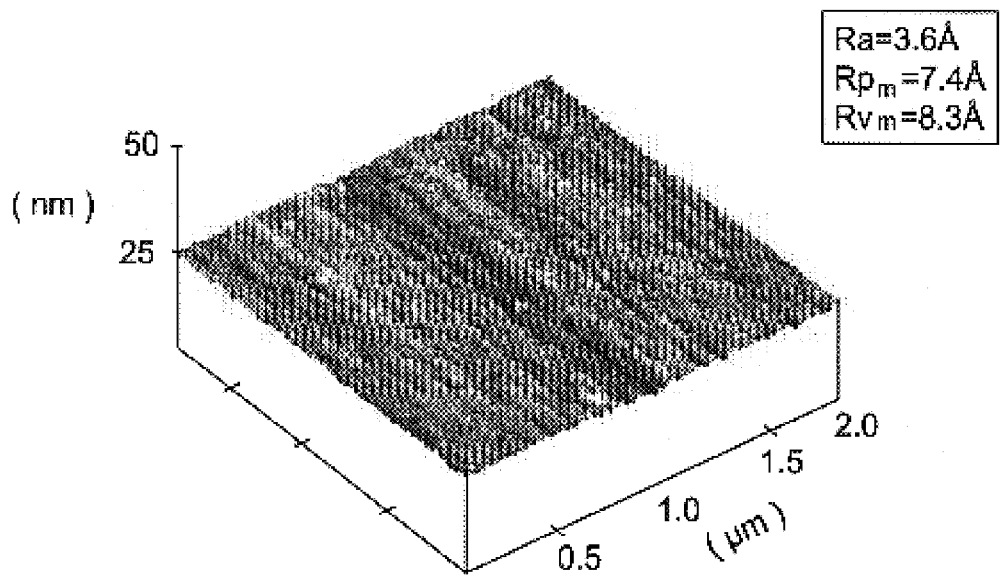
FIG. 3B is an AFM image of the surface of a Ni—P plated Al disc after polishing according to the present invention.

In testing of the system disclosed above, first step polished discs (Ra~15 Å) were electrochemical mechanically polished (EMP'd), the reduction in Ra is shown in FIG. 2. Additionally, as illustrated in FIGS. 3A and 3B, the high frequency surface features, as measured by AFM, for a standard colloidal polished and EMP'd surface compare favorably with each other. This result shows EMP is capable of smoothening a rough substrate surface to a super-smooth finish in an acceptable process time as illustrated in FIGS. 4 and 5.

Figure 4:
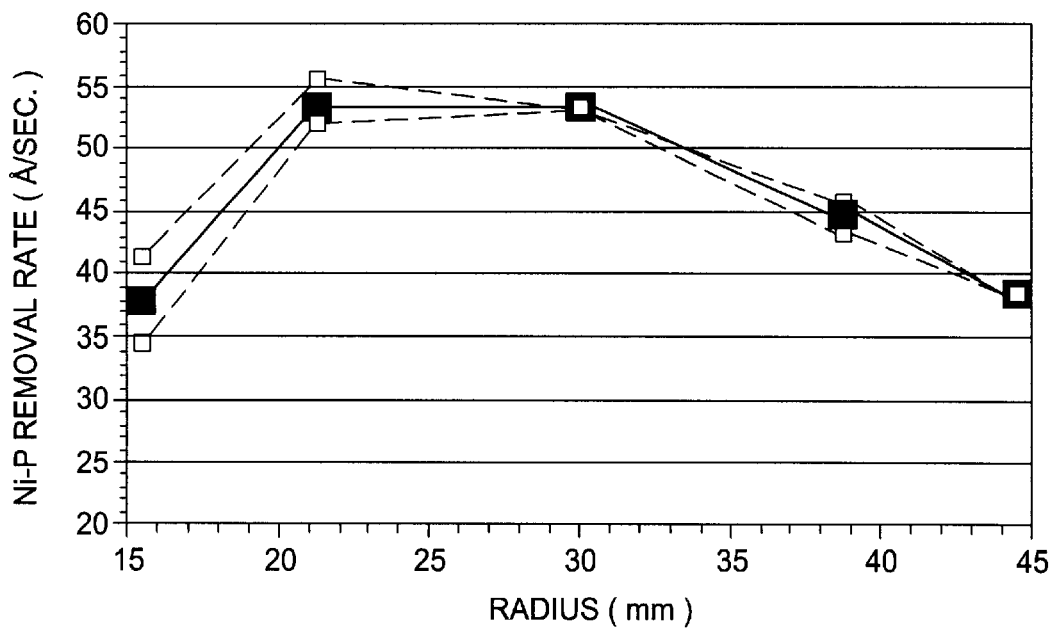
FIG. 4 is a plot showing an exemplary Ni—P removal rate as a function of disc radius after 1000 seconds of polishing according to the present invention.

FIG. 4 illustrates in detail the stock removal rate profile for a disc from ID to OD. The data shows removal is between 40–55 Å/sec. A 60 seconds process time produces 10 $\mu$-inches of Ni—P removal, as shown in FIG. 5. This compares favorably with second step planetary colloidal polishing which generates 12–15$\mu$-inches of removal. The key advantage is the EMP removal occurs circumferentially which eliminates the likelihood of inducing random scratches (which is detrimental to media performance). Standard conventional mechanical texturing produces 1–2 $\mu$-inches of removal in a 60 seconds process time.

Figure 5:
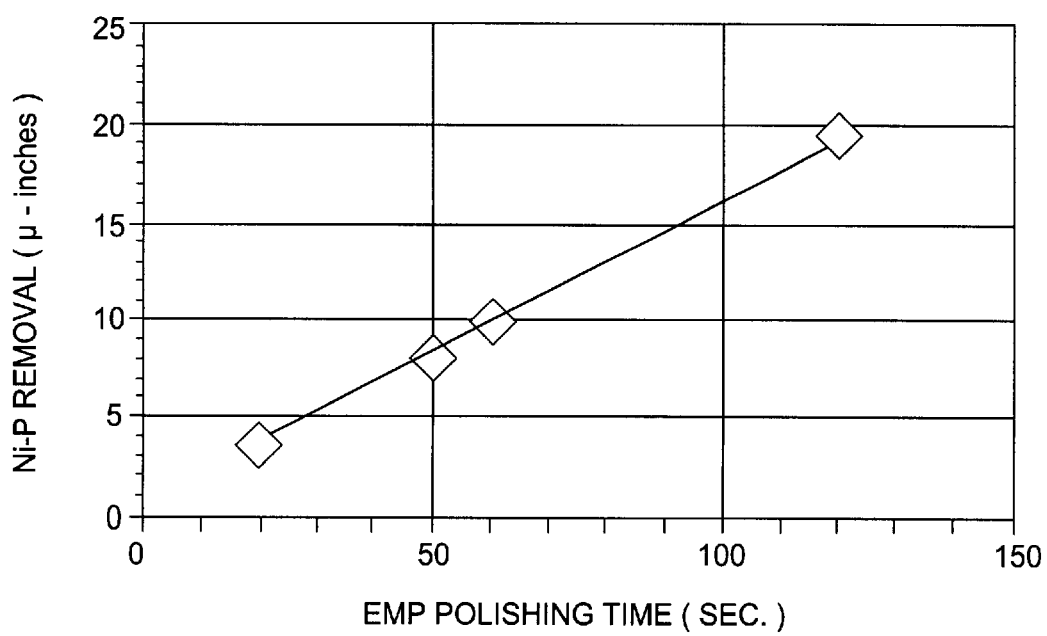
FIG. 5 is a plot showing the exemplary Ni—P removal as a function of time of polishing according to the present invention.

FIG. 5 shows a linear function between stock removal and process time. Therefore, a basic parameter to adjust if more removal is desired is processing time.

Figure 6A:
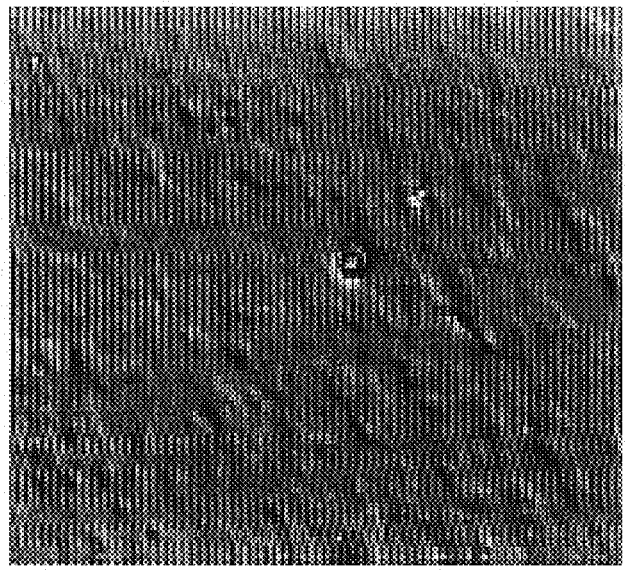
FIG. 6A is an AFM image of the surface of a standard Ni—P plated Al disc having an Al blank surface finish roughness Ra=80 Å, with no polishing.
Figure 6B:
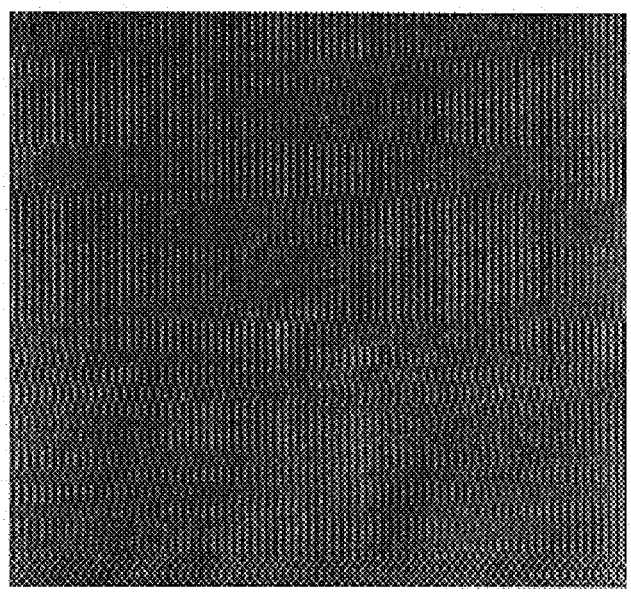
FIG. 6B is an AFM image of the surface of a standard Ni—P plated Al disc having an Al blank surface finish roughness Ra>100 Å, after polishing according to the present invention for 50 seconds.
Figure 6C:
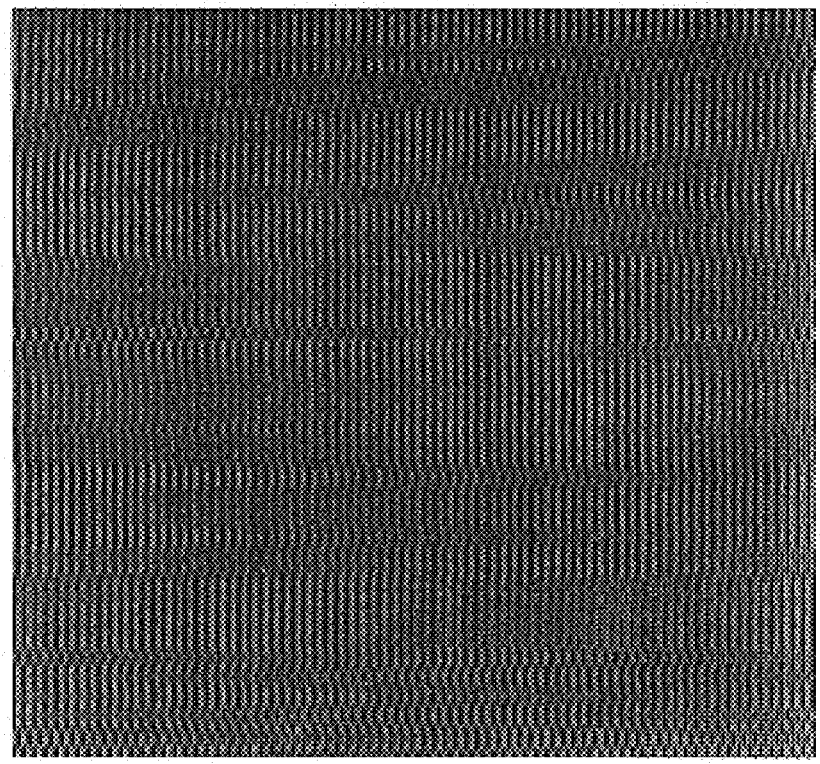
FIG. 6C is an AFM image of the surface of a standard Ni—P plated Al disc having an Al blank surface finish roughness Ra=40 Å, after polishing according to the present invention for 50 seconds.

FIG. 6A is a micrograph of an as Ni—P plated Al disc without polishing, wherein the Ra of the Al blank substrate is 80 Å. The key task for EMP is to eliminate the wall pattern, nodules and residual grind scratches. FIGS. 6B and 6C show the relative success of EMP on different Al blank finishes. The results suggest it is desirable to reduce the Al blank surface finish to better match the defect removal capability of EMP.

Other features and advantages of this invention should be apparent to a person of skill in the art who studies the above disclosure. Therefore, the scope of this invention should be limited only by the following claims.

What is claimed:

1. A method of polishing discs, comprising:
   submerging at least a portion of a Ni—P plated disc in a conductive slurry, the conductive slurry being between the disc and a conductive plate; and
   flowing electrical current between the conductive plate and the Ni—P plated disc so that Ni—P is removed from the surface of the Ni—P plated disc for providing an ultra smooth Ni—P disc surface.

2. The method as claimed in claim 1 further comprising moving at least one of a porous tape and the Ni—P Plated disc in order to provide relative motion between the porous tape and the Ni—P plated disc, wherein the porous tape is between the Ni—P plated disc and the conductive plate, and wherein the porous tape contacts the surface of the Ni—P plated disc for polishing the surface of the Ni—P plated disc.

3. The method as claimed in claim 2 wherein the moving at least one of a porous tape and the Ni—P plated disc comprises rotating the Ni—P plated disc.

4. The method as claimed in claim 2 wherein the moving at least one of a porous tape and the Ni—P plated disc comprises moving the porous tape over the surface of the Ni—P plated disc.

5. The method as claimed in claim 2 wherein the conductive slurry comprises abrasive particles which enhance polishing of the surface of the Ni—P plated disc during the relative motion between the Ni—P plated disc and the porous tape.

6. The method as claimed in claim 5 wherein the abrasive particles comprise diamond particles.

7. The method as claimed in claim 5 wherein the abrasive particles are carried by the porous tape during the relative motion between the Ni—P plated disc and the porous tape to texture the surface of the Ni—P plated disc.

8. The method as claimed in claim 7 wherein the texture is a circumferential texture.

9. The method as claimed in claim 1 wherein the conductive slurry comprises an electrolyte.

10. The method as claimed in claim 1 wherein the Ni—P plated disc is supported on a conductive spindle such that the electrical current may flow through the conductive spindle, the Ni—P plated disc, the conductive slurry, and the conductive plate.

11. The method as claimed in claim 1 wherein the Ni—P plated disc comprises a Ni—P coating on an aluminum substrate.

12. A method of polishing discs, comprising:
    providing a disc having a surface comprising metal;
    submerging at least a portion of the disc in a conductive slurry comprising electrolyte, the conductive slurry being between the disc and a conductive plate;
    reverse electroplating by flowing electrical current between the disc and the conductive plate thereby forming metal ions on the surface of the disc;
    providing a tape between the disc and the conductive plate, the tape comprising pores wherein the electrolyte flows through the pores of the tape towards the conductive plate; and
    removing the metal ions from the surface of the disc by moving at least one of the tape and the disc in order to provide a relative motion between the tape and the disc, wherein the tape contacts the surface of the disc and removes the metal ions from the surface of the disc for providing a polished disc having an ultra smooth disc surface.

13. The method as claimed in claim 12 wherein the disc comprises a metallic coating over a substrate.

14. The method as claimed in claim 12 wherein the disc is a metallic substrate.

15. The method as claimed in claim 12 wherein the conductive slurry comprises abrasive particles that polish the surface of the disc during the relative motion between the tape and the disc for providing a polished disc having an ultra smooth disc surface.

16. The method as claimed in claim 12 wherein the conductive slurry comprises abrasive particles that texture the surface of the disc during the relative motion between the tape and the disc for providing a texturized disc having a textured disc surface.

17. The method as claimed in claim 16 wherein the texturized disc has a circumferentially textured disc surface.

* * * * *